(12) United States Patent
Grinter et al.

(10) Patent No.: US 6,606,304 B1
(45) Date of Patent: Aug. 12, 2003

(54) SYSTEM FOR REAL-TIME MONITOR AND RESPONSE

(75) Inventors: Richard C. Grinter, Arlington, TX (US); David Alvarez, Plano, TX (US)

(73) Assignee: On Guard Plus, Surrey (GB)

( * ) Notice: Subject to any disclaimer, the term of this patent is extended or adjusted under 35 U.S.C. 154(b) by 0 days.

(21) Appl. No.: 09/316,220

(22) Filed: May 21, 1999

Related U.S. Application Data

(63) Continuation-in-part of application No. 09/237,931, filed on Jan. 27, 1999, now abandoned.

(51) Int. Cl.[7] .................................................. H04J 1/16
(52) U.S. Cl. ...................... 370/252; 370/386; 340/573.4
(58) Field of Search ................................. 370/252, 242, 370/216, 400, 401, 386, 412; 340/573.4, 825.54; 703/203

(56) References Cited

U.S. PATENT DOCUMENTS

| | | | | |
|---|---|---|---|---|
| 6,054,928 A | * | 4/2000 | Lemelson et al. | 340/573.4 |
| 6,067,477 A | * | 5/2000 | Wewalaarachchi et al. | 700/83 |
| 6,100,806 A | * | 8/2000 | Gaukel | 340/573.4 |

\* cited by examiner

*Primary Examiner*—Hassan Kizou
*Assistant Examiner*—John Pezzlo
(74) *Attorney, Agent, or Firm*—ZITO tlp; Joseph J. Zito

(57) ABSTRACT

A data and object monitoring and response system comprising a three tier infrastructure for optimization of interoperability and task specific adaptability. The system gathers information from a plurality of distributed data gathering units and assimilates, processes, analyzes and distributes the gathered data within a common system with rule based data processing for coordinated response to the data. The data gatehring units can be locally distributed or widely disbursed. The information gathered can be real-time collection of event data, historical data, systems monitoring, or other data. Regardless of the specific nature of the data, the system taught in the present invention, addresses a number of common problems associated with the collection, assimilation, processing of data. By dividing the system into a three tier interactive structure, the data can be gathered, evaluated and processed independently and efficiently and appropriate response can be effectively implemented. The processing tier, which includes the rules for analysis of the data, exists independent of the operator interface and data gathering tiers. A wide diversity of data collection equipment can be accommodated without modification of the operator interface or the processing tier. Processing rules can be modified without altering the collection and handeling of data, and a commonality of data structure eliminates multiple polling of collected data sets.

8 Claims, 5 Drawing Sheets

SYSTEM FOR REAL-TIME MONITOR AND RESPONSE

REFERENCE TO RELATED APPLICATIONS

This application is a continuation in part of patent application Ser. No. 09/237,931 filed Jan. 27, 1999 now abandoned and presently pending.

BACKGROUND OF THE INVENTION

The present invention relates to automated systems for monitoring real-time events for anomalies, recurring events specified activities and the like. More specifically, the present invention relates to a system for receiving input information from a plurality of sources, processing that information according to preset, definable rules, determining if the collected data satisfies or violates the parameters of the operational rules and executing appropriate response.

SUMMARY OF THE INVENTION

The system of the present invention is divided into three tiers: data gathering, processing and operator interface. Although the three tiers are interrelated to form the system, each of the three tiers can be independently modified while maintaining the integrity of the system.

A number of data gathering units are distributed throughout the system for information collection. The collected information is then processed according to a set of precessing rules. The rules can include automated response to certain data and presentation of other data within defined parameters to one or more operators for further processing and/or response. The data gathering units can include remote units, indirectly or intermittently connected to the system, networked units, local units connected directly to the system and other data gathering units. The data collection units can communicate over wireless or land line communication channels. Communication of information can include dial up on POTS lines with transmission of information in packet data, VOA, audio, DTMF tones or other viable data transmission means.

The processing is performed on one or more servers distributed throughout the system. The servers are linked to share data from a common data base and to execute rules processing according to a common rule set. Information collected is distributed throughout the system according to specified distribution rules for effective processing and response.

The information is gathered, handled and provided to the system in a common communication data format defined by the system. The data so gathered represents events which are then processed by the system according to a set of rules. The rules are executed on a tier separate from that of the data gathering and handling. The data is first processed on a automatic level, recognizing and responding to anticipated events. If a communicated event needs specific operator intervention, the system provides information of that event to a operator for appropriate direction and response. The system also monitors for specific events which are anticipated to occur at specified times. Failure to detect such an anticipated event can result in an automated active polling to determine the nature of the failure. Continued failure to detect can result in an alert to initiate operator intervention.

The present invention uses a scalable, three-tier client/server system using a component object Model. The system can be deployed in a 32 bit Windows environment. All screen input allows for easy internationalization, either through the use of graphical labels or table/header defined variables. Scalability ideally permits the system and/or at least substantial components of the system to operate on a single Windows 95 machine for small installations, and large distributed networks for big installations. The system permits scalability simply by changing deployment strategies.

A three-tier system with COM components separates the operator interface, business rules, and data gathering/handling into separate logical components, potentially written with different applications. The MS Visual Studio is ideal for this as the contained applications are designed for development of COM components and for the use and development of ActiveX.

The true three-tier system permits use of any number of ODBC compliant databases. These includes MS FoxPro, MS Visual FoxPro, MS Access, SQL Server, Oracle, dBase and others.

Three Tiers

The three tiers are the User Interface (UI), Business Rules Processing, and Database Gathering/Storage and Handling. The present invention is described in a first embodiment below as a system for monitoring the location, movement and related activities of a population of individuals. The system is designed in such a way as to permit interchangeability of the various components at each tier. The User Interface need not be the one developed for this invention, it could be a standard browser or other front end that suits the regional or language requirements of the end user. The Database Storage tier can be any ODBC compliant database structured to contain the basic information components used by the system. This permits relatively easy regionalization and scalability. The components of each tier of the present invention are as follows:

Tier I

User Interface

The user interface includes a number of components for display of desired information to the system operators and to allow access t the database and to provide a user-friendly interface for manipulation of the data and for implementation of desired response to the data presented to the operator. The exemplary operator interface described below includes the following components:

A. Data Entry/Edit Forms

Tabbed forms with name on each page
  Common navigation buttons with graphical labels
  Search on multiple fields and/or grid style incremental search
  Simple presentation with logical groupings and a minimum of mandatory fields B. Incident Handling Screens
  Explorer style ordering
  Auto Dialer for follow-up C. Report Generation Screens Data driven report menus allow users to specify the unique suite of reports that they will use in their operation. In addition, the report engine permits more advanced users to develop their own reports and fit them into the system without necessitating access to the system source code.

The document creation/delivery system permits the user to generate reports to a printer or disk file. Reports sent to the disk can be viewed on the screen or transmitted to another via facsimile or e-mail.

D. Training and Testing Mode

Training mode permits new and experienced users to hone their monitoring skills without affecting any real time data. Setting a flag in the local machine's system registry forces entry into training mode. In addition, an on line test can be administered to trainees to determine skill levels and proficiency. The test questions can be devised by administration and scored automatically by the system. Scores can be kept in an operator file and can be used to inform the skills based routing of incidents.

E. Remote Access Mode

Remote access mode is a custom interface for users dialing into the system from a remote location. This may be accomplished using any of a number of remote control applications, or ultimately on a web site via the Internet. Remote access requires password identification and presents the remote user with a subset of data (generally related to their caseload) and a subset of the functions available to local users.

Tier II

Business Rules

The business rules tier is the basic engine that determines how the system operates.

A. Communication Server Clients

Communication Server clients (ComServers) handle all communication with specific brands of Data acquisition equipment. The ComServer is designed to watch communication ports, which are assigned to a brand of equipment, and pass a normalized data "slug" to the database server for interpretation. ComServers provide a level of hardware abstraction for the database server by pre-processing information and passing it to the database by executing a method in the server. Typically, Data acquisition equipment calling in first identifies itself by unit number. As soon as the ComServer receives the identity block it executes the Early Warning method on the database server and passes a port ID and unit identification. The ComServer then continues to receive event information from the Data acquisition equipment. When the ComServer has received all events, it executes the Event Received method of the database server and passes the entire normalized slug. After the database server processes and stores all information, it executes the ComServer's DataSecure method and passes any kiss-off instructions to be sent to the Data acquisition equipment.

This process of two-way communication between the ComServer and database server serves several functions. First, because the database server receives an "early warning" that the ComServer has a specific unit on the line, the database server can begin to query the database and construct objects relevant to the owner of this particular unit. Second, the Data acquisition equipment is not "kissed off" by the ComServer until such time as it receives notification from the database server that the events have been processed and stored. Failure to get a kiss off from the ComServer will cause the Data acquisition equipment to call back and repeat the message. Finally, by using a pre-defined interface between ComServer and database server only one of the components has to be written specifically for a different brand of equipment. The ComServer handles differences between communication methods (modem, DTMF, flat file transfer, etc.) with the database server remaining essentially unchanged.

B. Database Server

The database server is the primary shared component in the middle tier. It is this component that is responsible for interpreting messages received from different ComServers into a common set of event codes, corrected (if necessary) for time zone and clock drift, and placed into the appropriate data storage tables. Similarly it processes timed out gatekeeper events and manages activation and clearing of violations upon the prompting of the violation service. The database server handles all data updates for components in the middle tier.

The database server is initiated by other middle tier or user interface components, and is never launched on its own. The database server contains several class libraries that define objects common throughout the application. These objects are described in latter detail.

While some of these objects (e.g. monitored individual, curfew, and the like) will remain fairly constant in different implementations of the system, other objects such as Slug, Last Message, and Event, may change based on the characteristics and features of the equipment being monitored.

Violation Service

The violation service determines when an incident should be presented as an alarm for follow up. All events processed by the data collection services that may be considered for processing as an alarm are placed into the violation service's table. The violation service then checks each potential alarm against a rules table to determine how that incident is to be treated.

The rules table allows local administrators to define specific rules based on five hierarchical levels from default handling to the specific monitored individual. The violation service can determine when an incident should be "activated" for operator processing. If a "clearing event" is defined and occurs within the specified time period, the violation service will clear both events. The violation service can also be directed to prepare incidents for follow-up by printing, faxing, or paging.

Gatekeeper Service

The gatekeeper service provides alarm generation on events that are the result of NOT receiving an event from specific Data acquisition equipment. Such events include OUT PAST A SET TIME, MISSING SANITY CHECKS, and FAILURE TO LEAVE AT A SET TIME. Since each of these events are based on variable schedules (curfew schedules or sanity call intervals) the host computer must handle them.

In one exemplary embodiment, gatekeeper methods required checking for these events by periodically polling the last message table for each registered Data acquisition equipment type. Each table was polled separately for each type of event, often resulting in multiple polling. This strategy has the disadvantage of requiring processor overhead, especially in installations with very large caseloads of monitored individuals.

The system of a second exemplary embodiment of the present invention avoids periodic polling. This will increase scalability by not having to dedicate a processor to this periodic polling. The gatekeeper is a communication server that monitors timer events rather than communication ports.

The gatekeeper of the present invention utilizes the services of the watchdog timer service, described below, to alert it when a gatekeeper event occurs. When the watchdog times out a gatekeeper event, it notifies the gatekeeper service when then executes a method in its associated instance of the database server to process the gatekeeper events.

The gatekeeper service is also referenced by instances of the database server that are initiated by communication server clients. The database server will execute a method in the gatekeeper service indicating the delta minutes until the next status (e.g. curfew or sanity) event for the Data acquisition equipment that it just serviced. If this time is earlier than the one that the gatekeeper has stored for this system, the gatekeeper will call the watchdog timer service and update it accordingly. If the time is later, the gatekeeper will not pass any new information to the watchdog timer service.

Watchdog Timer Service

The watchdog timer service is another important shared component in the middle tier. The sole function of the watchdog timer service is to keep a list of registered processes and the time that they are supposed to be executed. Only one timer need be set for the process at the top of the list. If this timer expires the appropriate process is notified. The watchdog timer service does not execute any methods in other COM/DCOM components other than to notify that a process has timed out. In this way, the same watchdog timer service can easily service numerous components without undue processor overhead and without getting bogged down with any one component.

There are two types of watchdog events: a watchdog monitor and a watchdog timer. They differ only in the component to be notified when the event times out. A watchdog monitor notifies any and all component objects registered with the watchdog as a monitor, while a watchdog timer notifies only the component object that set the timer.

The watchdog monitor is used to keep track of the proper operation of any unattended service. For example, each ComServer will register with the watchdog timer service with both a Ping Interval and a Line Interval (values for each are maintained in the system registry). The ping interval describes the number of minutes that the ComServer must "ping" the watchdog to verify that it is alive. This is often referred to as a "heartbeat." If the ComServer fails to respond with a "heartbeat" within the described interval, all registered watchdog monitors (such as a supervisor's workstation) will be notified and corrective action (such as checking the ComServer computer) is suggested. The line interval describes the number of minutes within which a call is anticipated from the monitoring equipment. This number varies with the caseload of monitored units as is recalculated by the database server with each call received. Every time a ComServer receives an event from an Data acquisition equipment the watchdog is fed with the appropriate line interval. If the line timer is triggered, all registered watchdog monitors are notified and corrective action (such as checking the phone lines) is suggested.

The watchdog timer is used to notify other component objects that certain processes are to be initiated. Components requiring the use of the watchdog timer register with the watchdog and pass a process ID and number of minutes for the timer. When this time expires the watchdog executes the notify method in the registered component. As described above, the gatekeeper service makes extensive use of this timer.

F. Routing of Incidents
   Skills based routing
   Least activity routing
   Same operator routing
G. Action Taken
   Call to monitored individual
H. Follow-up and Notification
   Notification handling rules
   Notification method
   Notification days and times
I. Random Contact
J. E-Mail and Facsimile Service
K. Voice Service
L. Backup and Off Site Monitoring Service
M. Security and Auditing Service The security and auditing service is a middle tier component which in initiated when a user logs into the system. The base security object contains default permissions available to any user and can be queried whenever the user attempts to perform a restricted operation. Maintaining a separate security object allows system security to be defined and modified without altering any other components. Individual users or groups of users can be given specific permissions beyond the default.

The auditing service keeps track of changes made to the database by users. It is contained in the security object since each query to the security object which results in granting a user specific permission will also result in an entry in the audit table.

For each different type of equipment monitored, a subclass of the base class is created with basic properties set to describe the current equipment and custom methods created, or base methods amended, to accommodate the features of the equipment. This object oriented design not only permits easy adoption of new features and equipment types into the system, but also makes maintenance and upgrades less complicated as adjustments to base classes are automatically inherited by child classes. Careful design of the methods and properties for each class allow developers to make changes at only one level in the object hierarchy.

BRIEF DESCRIPTION OF THE DRAWINGS

For a better understanding of the nature of the present invention, reference is had to the following figures and detailed description, wherein like elements are accorded like reference numerals, and wherein.

DETAILED DESCRIPTION OF PREFERRED EXEMPLARY EMBODIMENTS

Three Tiers

Figure 1:
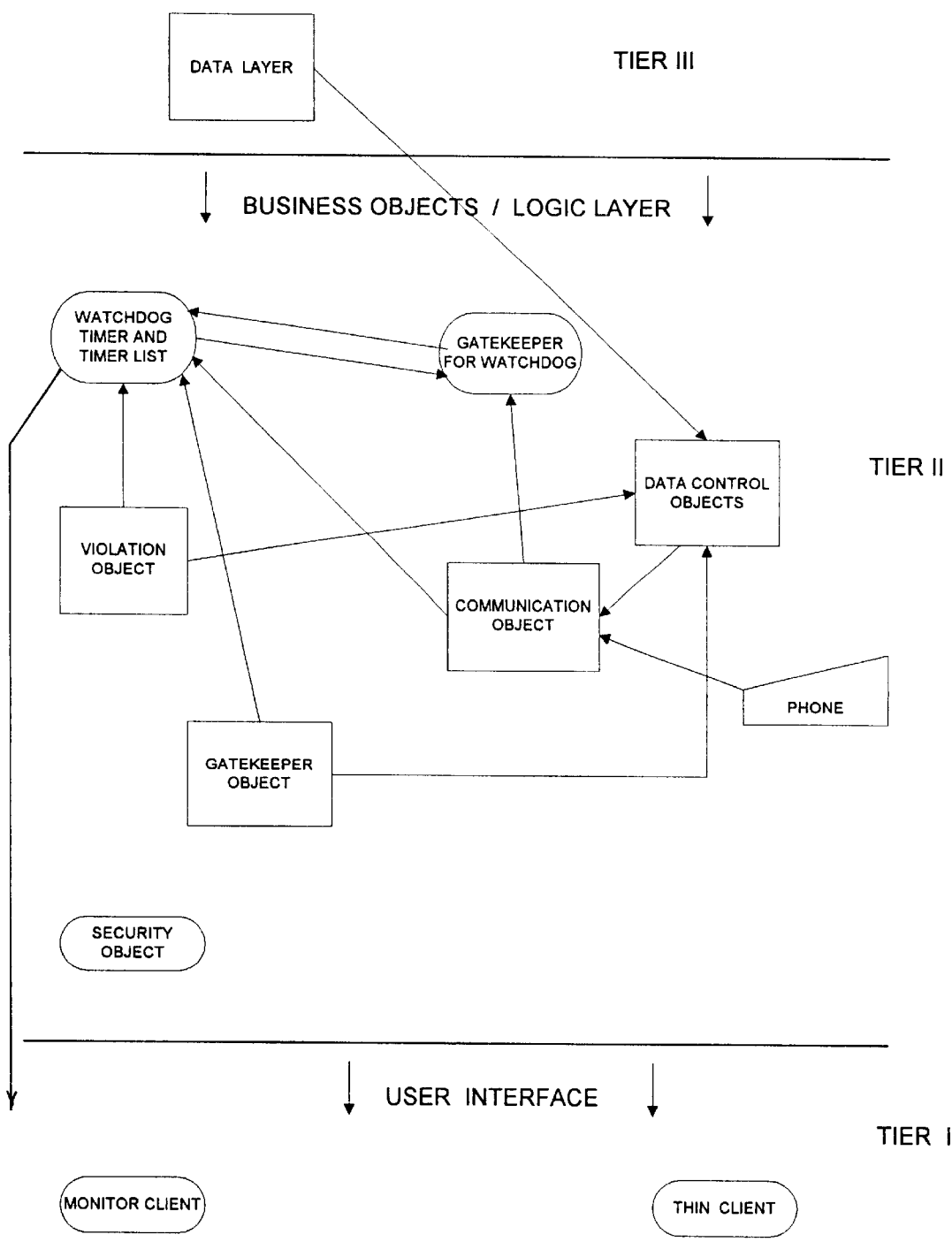
FIG. 1 is an exemplary system block functional diagram generally illustrating the three tiers.

The three tiers are Operator Interface, Rules Processing, and Database Gathering/Handling. The present invention is described in a first embodiment below as a system for monitoring the location, movement and related activities of a population of individuals. The components of each tier of the present invention are as follows:

Tier I

Operator Interface

The operator interface includes a number of components for display of desired information to the system operators and to allow access to the data base and to provide a user friendly interface for manipulation of the data and for implementation of desired response to the data presented to the operator. The exemplary operator interface described below includes the following components:

Data entry/edit screens
   Tabbed forms with name on each page
   Common navigation buttons with graphical labels
   Search on any field and/or grid style incremental search
   Simple presentation with logical groupings—minimum of forced fields and controls
Incident handling screens
   Explorer style ordering
   Auto dialer Report generation screens
Data driven report menu
Document creation/delivery system
Training and testing mode In the training and test mode, operators are taken through an on-line training test. The results of the test are used to determine the assignment of tasks to individual operators. Test questions can be devised by administration, and scored. Scores can be kept in an operator file. These scores can be used to inform the skills based routing of the Rule Processing tier of the system.

The system includes a messaging system for exchange of messages and information between operators and/or the system.

Tier II
Business Rules

The rules based processing tier of the system includes a set of rules for the processing the data gathered by the data gathering tier of the system. The system includes rules for processing the data based on standard responses to anticipated data and flexible responses to data based upon expert or knowledge based programming and/or operator intervention or operator directed responses. The responses can include further data queries, actions taken to assess the status of monitored individuals, or other appropriate actions.

In the exemplary embodiment, some of the following incident handling rules can be included:

Skills Based Routing of Violations

Monitoring operators can be graded on skill levels based on experience, knowledge of particular customers needs, or other indices and have incidents routed to their station much like tech support lines route questions to operators. These would be stored in the security object at log on. Least activity routing:

Prioritization of incidents can be defined,
Follow up returned to same operator,
Primary and secondary keys for violation handling,
In addition to traditional caseload divisions, incident handling can be defined for specialized populations within a given caseload,
Notification handling rules,
Notification method,
Notification times and days,
Random and scheduled calling services.

For individuals not on RF monitoring or subject to other periodic monitoring, the system queues up calls to be placed based on the individual's schedule. Calls are presented to the appropriate operator for implementation and handling. The results of the telephone call is then entered into the system database by the operator. This information, as well as all information in the data base, is available on-line to the systems for utilization in rule based processing and to each operator.

Before gathered data can be assimilated into the data base, it must be standardized. The Communication/Interpretation services provide the data manipulation so that data can be received from a variety of sources, including differing equipment and alternative input means. Interpretation services deal with a data "slug"; that is normalized in the following manner, as illustrated in FIG. 1. The pre-normalized data string may look like this:

nnnnnn hhmm yyyymmdd hhmm yyyymmdd xx
nnnnnn represents the unit number
hhmm represents time
yyyymmdd represents date
xx represents an event code In the exemplary embodiment, the first time and date (hhmm yyyymmdd) are the time and date the message was received by the host while the second, and subsequent, represent the time and date of each event communicated. The first twenty bytes are header information, common to all events contained in the data slug.

Figure 2:
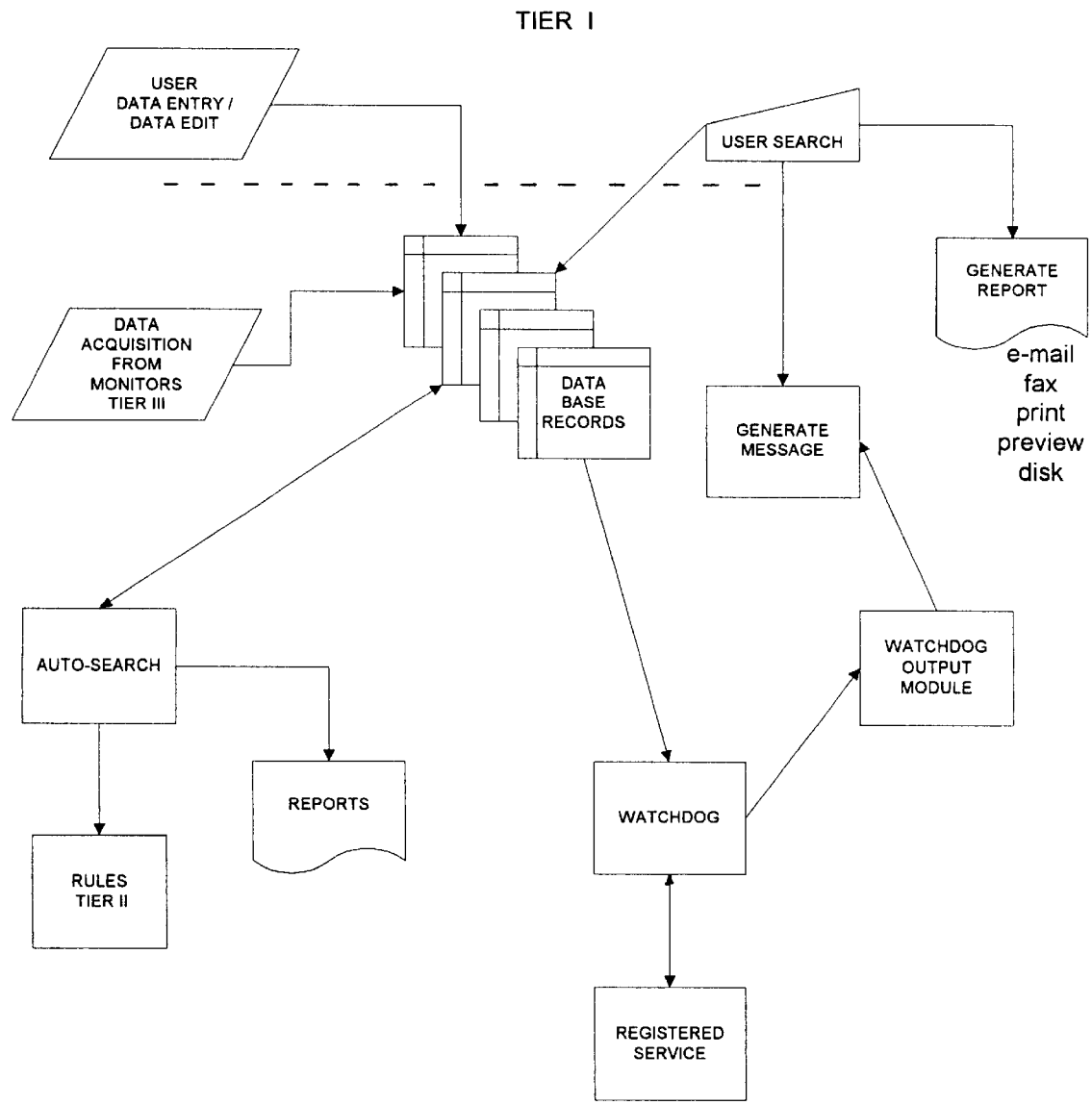
FIG. 2 is an exemplary block diagram of the interaction on the User interface tier.

This standard can be sub-classed for different equipment types to account for larger unit numbers, secondary event codes, possible inclusion of a transmitter ID, etc. AQs illustrated in FIG. 2, the communication service 20 will be responsible for receiving the data from the data collection equipment 21 and formatting the slug and passing it to the interpretation service 22.

Gatekeeper Services

Gatekeeper services 23 monitor "events" that are the result of not receiving a message that was expected. Examples include failure to return to a designated location within a specified time period, failure to leave on time, a failure to receive an expected status check within a specified time period, and the like. The gatekeeper 23 polls the data set at predesignated times to determine the status of anticipated events 24. If the polled data indicates that the anticipated event has occurred, "no incident" is recorded 25 and returned to the system 26. In the event that the data indicates that an anticipated event has not occurred 27, an "incident" is recorded and reported back to the system 26 been received E-mail and Facsimile Services E-mail services and facsimile services are alternative means of delivery for information of a certain class to be transmitted. They must be available to the operator interface as selectable choices for output of reporting (in addition to Print, Preview, and Disk). Upon selection a dialog box will prompt for facsimile number or e-mail address. Once selected, control should be returned to the operator. This is either background facsimile/e-mail or through the use of an ActiveX server on the network. In addition, both services must be capable of automatic generation and delivery of specified documents at pre-arranged times, or in regularly specified intervals.

Voice Services

Figure 3:
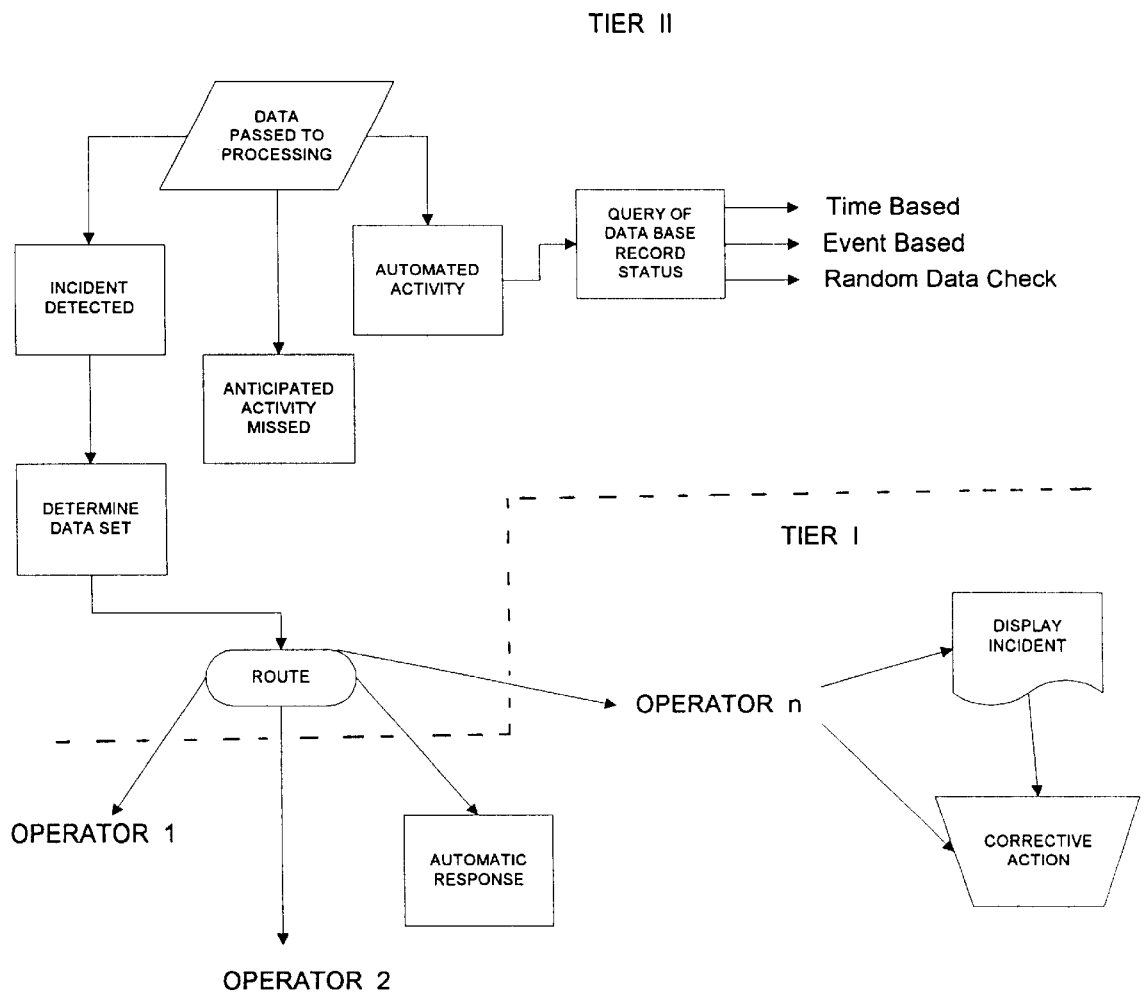
FIG. 3 is an exemplary block diagram of data routing between tier two and tier one.
Figure 4:
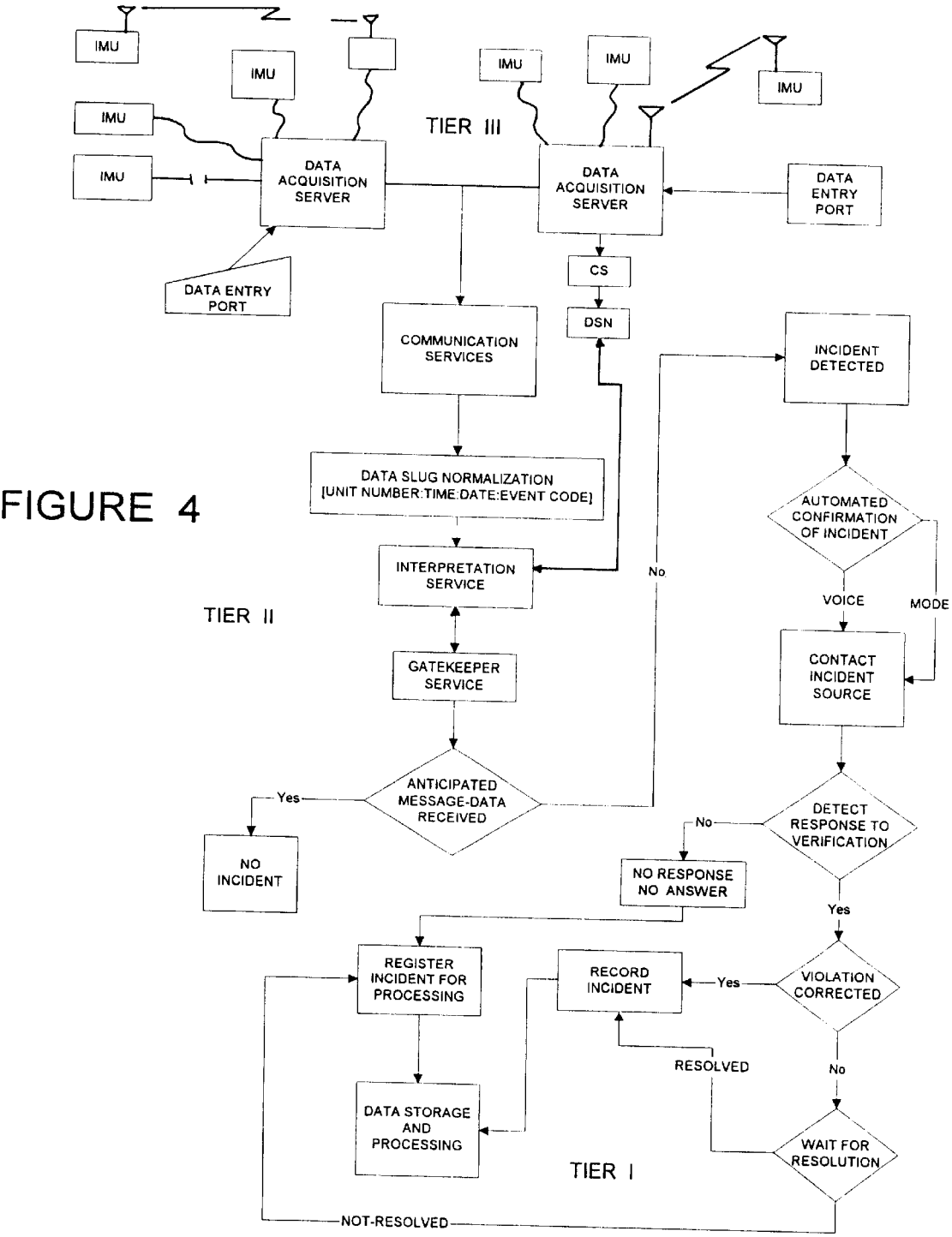
FIG. 4 is an exemplary block diagram illustrating the data acquisition of tier three and the data flow between tier three and tier two.
Figure 5:
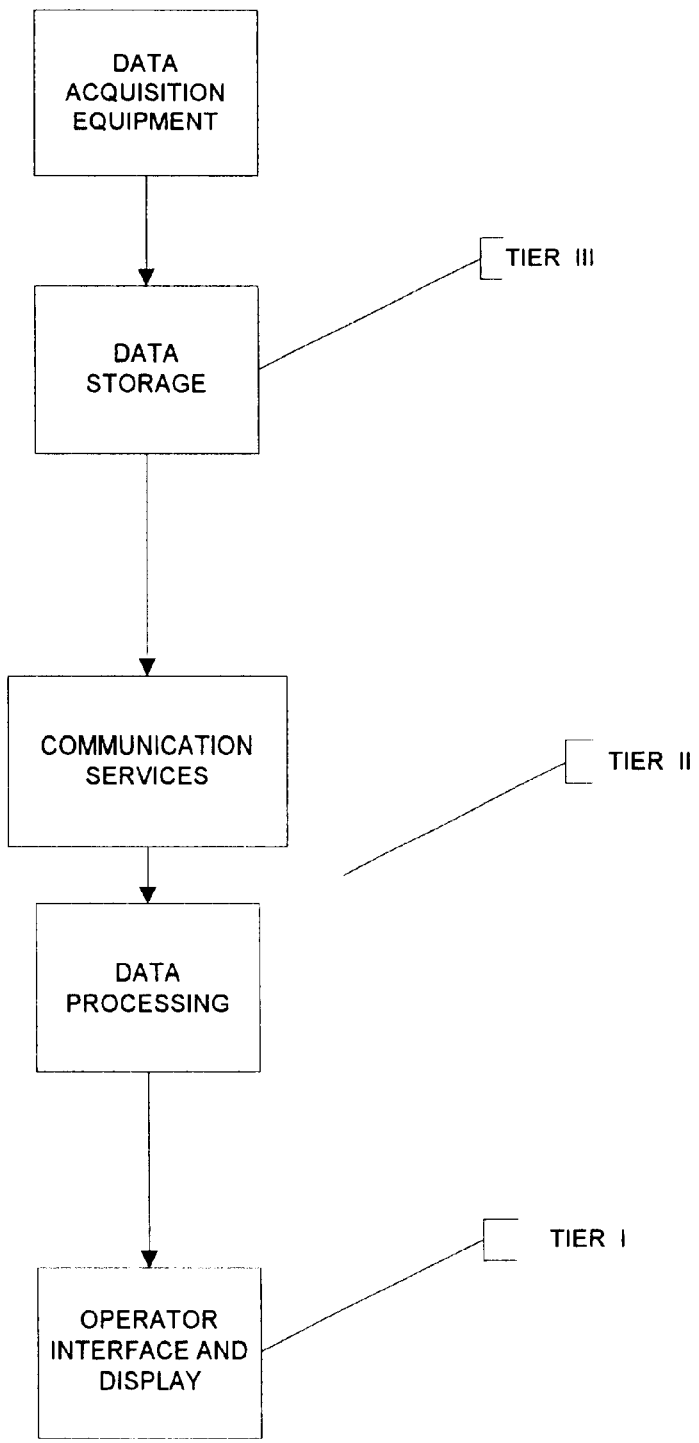
FIG. 5 is an exemplary overall diagram of the three tiers.

Voice services, FIG. 3, are primarily used for sending program calls to the remote units. In addition they can be used to intercept operator involvement in the early verification phases of events 31 that can be resolved by the individual or other personnel at the data gathering location. Such events may include loss of power, missing status calls, short duration leaves, etc.

When an "incident" is generated, for example by the gatekeeper 23 as described above, if the incident is of a predetermined class, the automated voice confirmation service 31 is accessed. A call is placed, by voice or modem as appropriate to the data collection location following a pre-defined time delay after the incident is reported, and the incident source is contacted 32. If the call is answered, a audible message may be played or a data packet sent by modem to determine the situation status and potentially seeking correction. The system then waits for a response to the query 33. If the system receives a response that the incident is corrected 34, the incident status is revised and recorded 35 back to the system 26 data base. If the call is not answered the incident status is updated to record the attempted resolution and failure and the data is recorded back to the system data base 35. if the call is answered and the incident remains uncorrected, another delay is started 37 to determine if the situation gets resolved within a specified time interval. Resolution or failure is then recorded back to the system data base 35. These services can be activated and deactivated on a caseload basis to assist in a decrease in operator load when desirable and to allow for increased operator direct involvement when available.

Backup and Off-site Monitoring Services

Automatic timed backup of data tables to specified locations either on or off site. Backup cannot require system shutdown.

Security and Auditing Services

In the exemplary embodiment illustrated, abstract security object can be created at login. This will permit increasing levels of table and field level security as the need develops. A method of the security object will return permissions when called if none are defined a default response will be returned. A transaction log will keep track of all changes, and fields in each table. The log will time, date, and identify the last change made to that record.

Watchdog Service

Watchdog services make sure that none of the unattended slave systems fail without notification. Currently data is being written to tables on a regular interval, this is monitored. This ensures that the watchdog will bark even if something other than the application causes a problem.

Tier III

Database Services

The data base of the exemplary embodiment of the system of the present invention tracks all current information relating to each of the individuals monitored by the system. The data base of the invention will contain the relevant and desired information about the specific knowledge base of data gathered by the data acquisition tier of the system. The integrity and accuracy of the data base of information is important to the system because the rule based processing depends upon data accuracy not only for specific actions but also for adjustments made to the rules based upon the composition of the data set. The data base is therefore maintained by the system with internal monitoring, including update/deletion triggers and referential integrity.

Security and Auditing

The system is adapted for relatively easy addition of new technologies. Common business rules are therefore be independent of equipment. Equipment should be registered with the system in a common registry. Objects that deal with specific equipment or technologies can be sub-classed to deal with equipment specific features.

Common Objects
Level 1 authority—Agency
Properties
　Primary key
　Name
　Address
　City
　State/province
　Postal code
　Telephone number(s)
　Contact
　Special instructions Force linkage between level 2 and 3 authorities?
　Level 2 authority—District
　Properties
　　Primary key
　　Level 1 authority key
　　Name
　　Address
　　City State/province
　　Postal code
　　Telephone number(s)
　　Contact
　　Time zone relative to host Level 3 authority—Officer
Properties
　Primary key
　Level 1 authority key
　Level 2 authority key (if forced)
　Name
　Address
　City
　State/province
　Postal code
　Telephone number(s)
　Office Cellular
　Home
　Pager
　Contact Monitored Individual
Properties
　Primary key
　Level 3 authority key
　Level 2 authority key
　Level 1 authority key
　System type
　Number of units assigned to individual
　Unit number (for identification)
　Transmitter ID
　Transmitter timeout
　Sanity call interval
　Name
　Address
　City/town
　County
　State/province
　Postal code
　Phone number(s)
　Agency assigned case number/DOC number
　Government ID Social Security number
　Time zone relative to host
　Alternate locations
　Race
　Sex
　Marital status
　Height and weight
　Date of birth
　Eye and hair color
　Picture
　Notification priority
　Current status
　Term on ED
　Start date Termination date
Reason for termination
Type of monitoring
Offense
Specialized caseload/program
Special instructions Curfews
Properties
    Day of week
    Number in the day
    Date range curfew active
    Leave time
    Enter time
    Offender
    Date/time of last change Equipment
Properties
    Unit number
    System type
    Serial number
    Transmitter ID
    Sanity call interval
    Assigned to client?
    Tamper Receiver and Transmitter
    TX in range
    AC present
    Time zone relative to host
    Battery condition Receiver and Transmitter
Transmitter Timeout
    Slug raw data communicated by the unit. May be pre-processed by the ComServer.

Properties
    Unit number
    Unit assigned
    Time received
    Date received
    System type
    Transmitter ID
    Number of events contained Event Information
    Event represents a single reportable event owned by Slug Properties
    Time of event
    Date of event
    Type of event Incident—an event or events defined by the processing rules as an incident.
Properties
    Time of event
    Date of event
    Type of event
    Type of incident
    Controlling authority Level 1 to 3 authority, offender, caseload, etc.
    Activation time and date
    Follow up method
    Method(s) of reporting and time to report
    Print
    Facsimile
    Page
    Telephone call
    E-mail
    Staff handling incident
    Was incident handled? When?

Transaction—this is any event, incident, change, etc. completed in the system.
Properties
    Transaction type
    Staff ID
    Offender ID
    Time of transaction
    Date of transaction
    Unit number if applicable
    Transmitter ID if applicable Security—allows unique definition of permissions
Properties
    Operator ID
    Incident handling preference
    Array of permissions Last Message—status of equipment/offender as of last contact
Properties
    Unit number
    Offender key
    Time and date of last report
    Time and date of next sanity call
    Time and date of next curfew
    Time and date of last movement
    Unit assigned
    Transmitter tamper status
    Receiver tamper status
    Transmitter in range
    A/C Power
    Receiver battery status
    Transmitter battery status
    Transmitter timeout
    Offender out past curfew
    Time and date offender became out past curfew Service Specific Objects
Properties
    Default sanity call interval
    Debug level
    Number of channels available
    Number of registered systems
    Array of registered systems GateKeeper—monitors non-communication events
Properties
    Number of registered systems
    Array of registered systems Callback grace time
Missed sanity call reminder
Unit assigned Other features:
Low level supervision
Fee collection
Drug/alcohol monitoring
The incident server of the exemplary embodiment of the present invention handles all of the following functions:
Watchdog
Timing out of possible violations
Activating violations for operator handling
Auto paging of selected violations
Processing results of voice calls
Printing of incidents automatically or on-demand
Queuing up voice calls for random contact In alternative embodiments, the functions of the incident service can be separated into several different components.
Watchdog Service The watchdog service will be a separate COM/DCOM component that will warn of any unattended service which has faltered. For communication servers, the system can falter due to telephone service interruption or process termination within certain limits, without the generation of an incident. In one embodiment, the watchdog checks the time and date stamp on the raw data file, xxx_DATA.DBF, to see if it has been updated within a pre-determined time interval. The time interval is based on the caseload of active units in the field and is recalculated on a periodic basis. The watchdog currently barks by sounding the bell on the incident server and prints a message to the incident server screen.

Other unattended servers are checked by referring to the time and date stamp on a watchdog table. This table contains only one record which is updated on every cycle of the unattended server. An entry in an .INI file determines the maximum interval permitted between updates.

An alternative watchdog service requires that each component to be watched must first register with the watchdog. Registration will include an identification key, and time in delta minutes. If the service is currently registered, registration will simply update the information. When a service is terminated manually, it will un-register with the watchdog.

During normal operation the service will continue to "ping" the watchdog with the identification key and the delta minutes. The "ping" is the same as registration to the watched service. The watchdog considers a "ping" as a registration only if the service is not currently registered.

A second component associated with the watchdog is a watchdog output module. This will also register with the watchdog to receive any watchdog warnings. All computers on the network can register for watchdog output, or simply operator workstations. This will eliminate the need for the incident server to be physically located near the operators who need to be warned of hosted systems.

The watchdog system will use the ActiveX timer control developed for this application. Whenever a watchdog is not actually "barking" there will be almost no processor overhead for supporting the service. Watchdog API includes the following exposed methods:
FeedTheDog(nProcessID, nDeltaMinutes)
RegisterMonitor(cProgID)
UnRegisterMonitor(cProgID)
RegisterTimer(cProgID,nProcessID)
UnRegisterTimer(cProgID)
The Service ID could include some means of distinguishing between an output and watched service. The watchdog services can be written in VC++.
Gatekeeper Service The Gatekeeper service provides alarm generation on "non-event events". Examples include OUT PAST A SET TIME and MISSING STATUS CHECK. These are events that are the result of not receiving anticipated data from a monitoring unit. In one exemplary embodiment, gatekeeper methods required checking for these events by periodically polling the last message table for each registered Com-Server. Each table must be polled separately for each event, often resulting in multiple polling.

The system of a second exemplary embodiment of the present invention avoids the polling. This will increase the scalability by not having to dedicate a processor to this periodic polling. The gatekeeper is a communication server that monitors timer events rather than communication ports. It will invoke an instance of the standard Database Server and pass it "gatekeeper events" as they time out.

The Gatekeeper of the present invention utilizes the services of the watchdog timer, described above, to alert it when a out of time or missed status event occurs. On startup, the Gatekeeper initializes the Database Server and registers with it. The Database Server then checks all registered last message tables and determines the next time for a Gatekeeper event. It will register each time with the Gatekeeper as a Process ID (representing system type and event type), the number of minutes before timing out, and the Unit Number associated with this event.

Each database server will call a method in the Gatekeeper every time it processes a message. The database server will pass the appropriate Process ID, unit number, and the delta minutes it has stored in the last message table for this unit. If this time is earlier than the one that the Gatekeeper has stored for this Process ID, the Gatekeeper will call the watchdog and update it. If the unit number and Process ID match and the delta minutes is greater than that being stored, the timer will be stopped and the database server will be consulted to find the new next event and the watchdog will be fed. Otherwise the Gatekeeper will simply ignore the report.

When the watchdog times out a Gatekeeper event, it calls a process method in the Gatekeeper. The Gatekeeper then executes the appropriate method in the database server to process this and other events that may be queued up for the same time.

The Gatekeeper API will have the following methods exposed to the database servers:
RegisterEvent(nProcessID, nDeltaMinutes, nUnitNumber)
The database server will support the following exposed methods for the Gatekeeper:
Register(cProcessName, nServerType, nchannels): The Gatekeeper will only need to pass the cProcessName parameter the other parameters are specific to the communication servers.
UnRegister(cProcessName, nServerType)
GateKeeperEvent(nProcessID)
Incident Service The current incident server references a daily incident table, VIO_mmdd.DBF where "mm" represents the month and "dd" represents the day. This table is periodically polled (for example, every 15 seconds) to determine if there is any action to take. Actions performed by the Incident Server during polling include:

Setting time for violations to become active

Clearing violations that are not to be acted upon

Activating violations at the assigned time

Producing follow-up events such as printing, paging, or facsimile.

These events are all triggered by flags in the incident table that are set either by the incident server or other modules that handle one or another aspect of incident processing (e.g., ComServers, Operator Interface). The incident service of a second exemplary embodiment will do away with the periodic polling by substituting the strategy employed by the watchdog service, using the Watchdog timer control and the Gatekeeper COM component to kick off the incident processing.

The "Incident Server" of the first exemplary embodiment is contained in the Gatekeeper component and the Database Server. Incident and Gatekeeper modules can be run separately or as part of the same component depending upon caseload. At launch the component will be informed whether it is the Gatekeeper, Incident Server, or both. As the Gatekeeper has already been defined, we will only discuss the incident server component here.

The Incident Server will utilize the services of the watchdog timer, described above, to alert it when a incident needs attention. On startup, the Incident Server initializes the Database Server and registers with it. The Database Server will then check the appropriate incident table and determine the next time for a incident event. It will register this time with the Incident Server as a Process ID, the number of minutes before timing out, and the Unit Number associated with this event.

Every time a incident is placed into the incident table, the Database Server will feed the Gatekeeper a process ID and a zero time. This will cause the Gatekeeper to immediately process a ServerEvent in its instance of the Database Server.

Incident Handling

Routing

Skills based routing involves presenting a incident to an operator that is best equipped to handle it. This could include facility with a foreign language, previous handling of similar incidents from a specific individual, previous handling of other incidents from a specific individual, or experience with a particular caseload.

Least busy routing involves presenting a incident to the operator who has the fewest incidents in their queue or who has handled the fewest incidents.

Handling

Priority handling presents incidents to operators in an order determined by the seriousness of the incident matched with the experience and/or skills of the operator. This requires that management clearly prioritize incidents, individuals and operators for such handling.

Timed handling presents incidents in the order they were received and/or occurred.

Generally with a routing strategy the operator would be presented with only one incident on the screen. The incident presented would be determined by the routing and/or handling strategy. Experience suggests that denying operators the ability to select from among all pending alarms can cause problems, as management cannot conceivably determine all possible contingencies and codify them. Therefore, the present invention addresses the problem of how to present operators with enough information to make some intelligent decisions on processing incidents while at the same time highlighting incidents or individuals that management has targeted for specialized handling.

To address this, the incident handler of the second exemplary embodiment presents all active incidents to all registered operators, but will prioritize them according to a operator profile. In addition, the interface will permit the operator to re-order the display in a manner similar to the Windows Explorer, grouping incidents together by offender, incident type, priority level, or caseload.

Operator Profiles

The system administrator will assign each authorized operator an "operator profile". A default profile will be built on system installation. The profile will consist of up to 32 attributes that can be defined by the system administrator. If no attributes are defined, or if no individual operator profiles are entered, system defaults will be used. Each attribute has only two possible values and will be assigned a value of 0 for TRUE or 1 for FALSE. Examples of attributes could be knowledge of a specific foreign language, experience with certain caseloads, supervisory status, etc. The array of attribute values will compose a single 32-bit DWORD value that will uniquely identify a operator's permanent profile.

This permanent "profile" will be passed to a "profile administrator" component when the operator logs onto the incident-processing screen and will return to the operator an "active profile". The active profile will determine how incidents are ordered and colored on the operator's screen. The purpose of the profile administrator is simply to ensure that the operators currently logged into the system cover all attributes. For example, if only one operator is logged into the system, that operator will inherit all operator attributes and incidents will be ordered by priority and/or time activated.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

We claim:

1. A data and object monitoring and response system with a three tier infrastructure for optimization of interoperability and task specific adaptability, comprising:

a data acquisition and communication tier, including:

a plurality of distributed data gathering units having non-common interface protocols for acquiring data, wherein:

said data acquisition and communication tier assimilates, processes, analyzes and communicates said acquired data; and a data processing tier including:

a data receiving component for receiving said communicated data from said data acquisition tier;

a comparative data base for comparing said acquired data to a predetermined set of anticipated data; and a rule based data processing component for coordinated response to said acquired data, based upon said comparison; and a user interface tier;

wherein:

said acquired data includes indicia of the source of said data and the time of acquisition; and said data base includes storage for a plurality of anticipated events corresponding to anticipated acquired data including the source and time of acquisition;

said data base further including a flexible plurality of specified responses to the comparison of said indicia to said data base; and a flexible formula for assignment of event response to one of a plurality of routes in said user interface tier.

2. The system of claim 1, wherein:

said data processing tier includes a gatekeeper for generation of an incident detection signal in response to the absence of one or more of said anticipated events within said established criteria.

3. The system of claim 3, further including:

an incident discriminator for determination of routing of said incidents to said user interface tier.

4. The system of claim 2, further including:

an automated component for recontacting said data gathering source corresponding to said incident detection signal.

5. The system of claim 1, wherein:

said user interface tier includes a component for entry of anticipated data information.

6. The system of claim 1, further including:

a watchdog component for registration of said anticipated data information within said data processing tier, said watchdog monitoring said acquired data at intervals determined by said registered incidents for data corresponding to said anticipated data.

7. The system of claim 6, said watchdog providing a notification signal to said gatekeeper for indication of said missed events.

8. A data and object monitoring and response system with a three tier infrastructure for optimization of interoperability and task specific adaptability, comprising:

a data acquisition and communication tier, including:
 a plurality of distributed data gathering units each having one or more interface protocols for acquiring data which includes indicia of the source of said data and the time of acquisition;
 a communication component for communicating said acquired data; and
 a processor between said data gathering units and said communication component, for normalizing the data from said plurality of distributed data gathering units to provide said indicia in a common format;

a data processing tier, including:
 a data receiving component for receiving said communicated data from said data acquisition tier;
 a comparative data base with a set of anticipated data, said data base including:
  storage for a plurality of anticipated events corresponding to anticipated acquired data, including the source and time of acquisition;
  a flexible plurality of specified responses to the comparison of said indicia to said data base;
  a flexible formula for assignment of event response to one of a plurality of routes in said user interface tier, for determination of routing of said events to said user interface tier said formula being updated based upon acquired data and registered users;
 a rule based data processing component for comparing said acquired data with said predetermined set of anticipated data and for coordinated response to said acquired data, based upon said comparison, including:
  a gatekeeper for generation of an incident detection signal in response to the absence of one or more of said anticipated events within said established criteria;
  an automated component for recontacting said data gathering source corresponding to said incident detection signal;
  a watchdog component for registration of said anticipated event information, said watchdog monitoring said acquired data at intervals determined by said registered incidents for data corresponding to said anticipated events;
  said watchdog providing a notification signal to said gatekeeper for indication of said missed events a user interface tier, including:
 user interface components including user registration and access to said data base and to said acquired data;
 components for entry of anticipated event information; and
 components for user directed response to incidents.

* * * * *